United States Patent [19]

Wong

[11] 4,304,321

[45] Dec. 8, 1981

[54] THERMALLY RESPONSIVE ACTUATOR DEVICE PARTICULARLY FOR AUTOMOTIVE FAN CLUTCH

[75] Inventor: Backman Wong, Wayland, Mass.

[73] Assignee: Standard-Thomson Corporation, Waltham, Mass.

[21] Appl. No.: 8,709

[22] Filed: Feb. 1, 1979

Related U.S. Application Data

[63] Continuation-in-part of Ser. No. 4,393, Jan. 18, 1979, abandoned.

[51] Int. Cl.³ .............................................. F16D 43/25
[52] U.S. Cl. ................................. 192/82 T; 192/85 A
[58] Field of Search ............. 192/82 T, 85 A, 85 CA, 192/58 B; 236/101 D, 99 K, 99 D, 99 R, 100; 60/508, 509; 73/368.3

[56] References Cited

U.S. PATENT DOCUMENTS

| 2,973,903 | 3/1961 | Saliaris | 236/99 D |
|---|---|---|---|
| 2,974,768 | 3/1961 | Hause | 192/82 T |
| 3,019,875 | 2/1962 | Fowler | 192/82 T X |
| 3,053,363 | 9/1962 | Weir | 192/82 T X |
| 3,075,691 | 1/1963 | Kelly | 192/82 T X |
| 3,077,298 | 2/1963 | Fowler | 192/82 T X |
| 3,135,370 | 6/1964 | Sutton | 192/82 T X |
| 3,180,149 | 4/1965 | Woods | 73/368.3 X |
| 3,257,808 | 6/1966 | Kuiper | 192/82 T X |

Primary Examiner—Rodney H. Bonck
Attorney, Agent, or Firm—Jacox & Meckstroth

[57] ABSTRACT

A thermally responsive actuator device which includes an extending tubular coil temperature sensing portion. The tubular coil contains a thermally responsive expansible-contractible material which operates upon an actuator member. Thus, the thermally responsive material accurately and rapidly senses ambient or air mass flow temperature conditions for operation of the actuator member.

1 Claim, 5 Drawing Figures

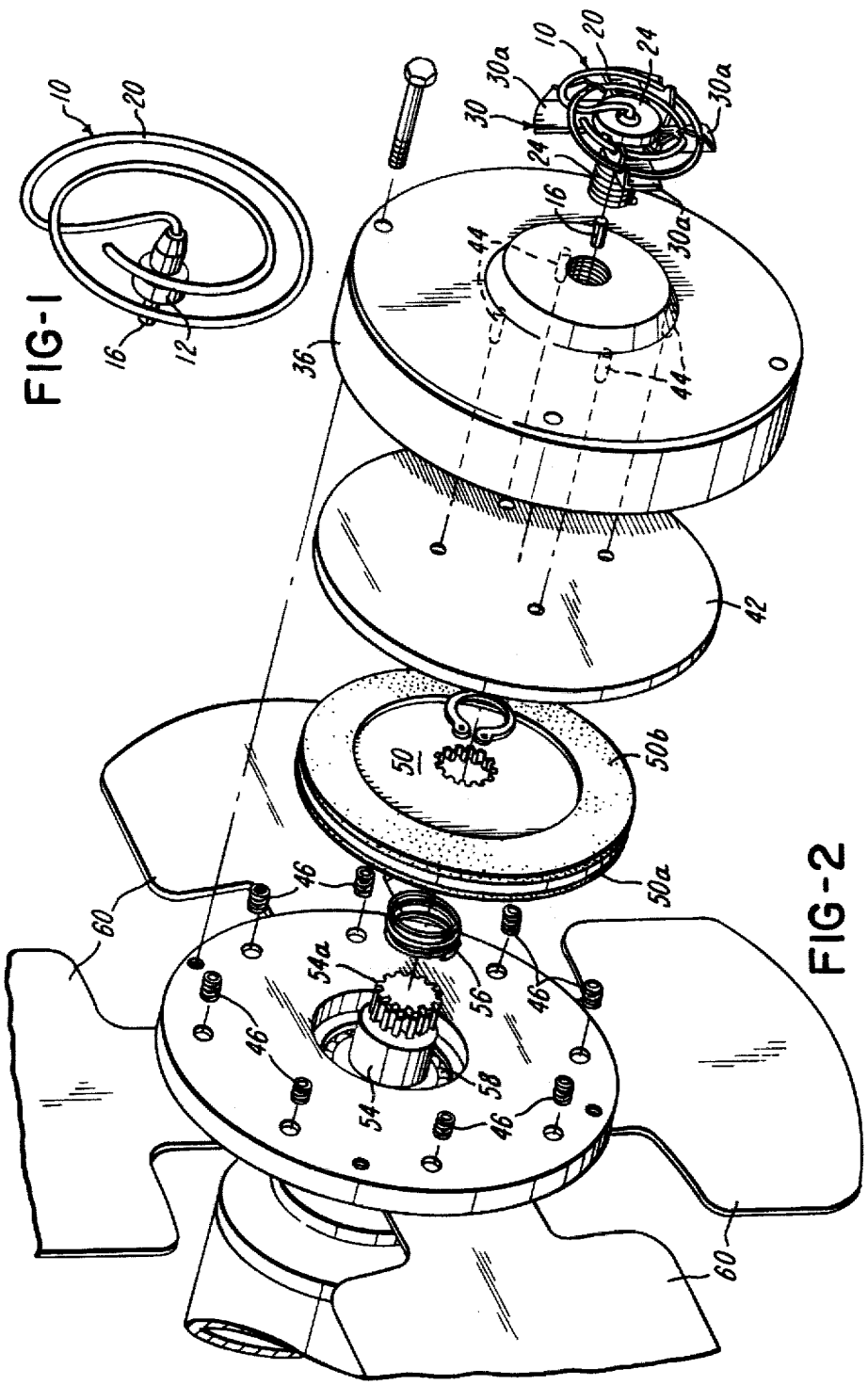

THERMALLY RESPONSIVE ACTUATOR DEVICE PARTICULARLY FOR AUTOMOTIVE FAN CLUTCH

RELATED APPLICATION

This application is a continuation-in-part of co-pending Application Ser. No. 004,393, filed Jan. 18, 1979 and now abandoned.

BACKGROUND OF THE INVENTION

Numerous types of thermally responsive actuator devices have been employed in combination with an automotive fan clutch. However, difficulties have arisen in obtaining consistent accurate rapid operation of an automotive fan clutch at desired temperatures.

It is therefore an object of this invention to provide a thermally responsive actuator device particularly for use with an automotive fan clutch which device operates the clutch consistently accurately and rapidly at desired temperatures.

Another object of this invention is to provide a thermally responsive actuator device which has high operational capacity in consideration of its physical size.

Another object of this invention is to provide a thermally responsive actuator device which is capable of accurately sensing temperature changes in air mass flow.

Another object of this invention is to provide a thermally responsive actuator device which during rotation thereof creates air flow adjacent the actuator device, so that the actuator device accurately senses ambient air conditions.

Other objects and advantages of the thermally responsive actuator device of this invention reside in the construction of parts, the combination thereof, the method of manufacture, and the mode of operation, as will become more apparent from the following description.

BRIEF DESCRIPTION OF THE VIEWS OF THE DRAWINGS

FIG. 1 is a perspective view of a thermally responsive actuator device of this invention.

FIG. 2 is an exploded perspective view, with parts broken away and drawn on a slightly smaller scale than FIG. 1, of a thermally responsive actuator device of this invention in combination with an automotive fan clutch unit.

DETAILED DESCRIPTION OF THE INVENTION

Figure 5:
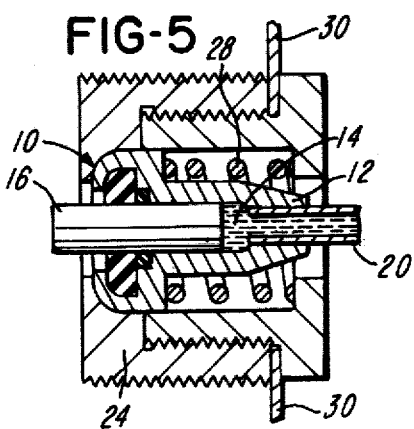
FIG. 5 is a sectional view, drawn on a larger scale than the other figures, showing the portion of a thermally responsive actuator device of this invention which includes a movable actuator stem.

FIGS. 1 and 5 show a thermally responsive actuator device 10 of this invention which includes a casing 12. The casing 12 has a cavity 14 which has therewithin a portion of an actuator rod or stem 16. The actuator rod or stem 16 extends from the casing 12 and is axially movable with respect thereto. Joined to the casing 12 and in communication with the cavity 14 thereof is an elongate coiled tube 20. As best illustrated in FIG. 1, the coiled tube 20 has at least one convolution and may comprise several convolutions.

Within the cavity 14 and within the coiled tube 20 is a thermally responsive expansible-contractible material which comprises any suitable element or combination of elements giving the material the physical property characteristic of a high coefficient of expansion over a given temperature range. The thermally responsive material may, for example, be a wax, or polyolefinic material, or a material of the plastics class, or the like.

The casing 12 is enclosed within a housing 24 and is movable with respect thereto. A spring 28 urges the casing 12 against an internal wall of the housing 24. A bracket 30 is attached to the housing 24 and extends therefrom in the form of a plurality of wings 30a which engage and support the coiled tube 20.

The exterior of the housing 24 is shown as being threaded and is threadedly mounted within a clutch housing 36, having a cavity 38 therein. The actuator rod 16 extends into the cavity 38.

Within the cavity 38 is an engagement plate 42 which is supported upon pin members 44, which permit axial movement of the engagement plate 42. A plurality of spring members 46 are recessed in an internal wall of the cavity 38 and engage the engagement plate 42 and urge axial movement thereof toward the actuator rod 16. Also within the cavity 38 of the clutch housing 36 and adjacent the engagement plate 42 is a clutch plate 50 which has opposed clutch surfaces 50a and 50b. The clutch plate 50 is supported by a splined portion 54a of a drive shaft 54 and is urged by a spring 56 toward the engagement plate 42. The clutch plate 50 is axially movable upon the splined portion 54a of the drive shaft 54 and is rotatable with rotation of the drive shaft 54. Normally the drive shaft 54 is rotated with operation of an automotive engine with which the apparatus discussed and shown herein is associated.

The drive shaft 54 has attached thereto a bearing member 58, upon which the clutch housing 36 is supported for rotation with respect to the drive shaft 54. The clutch housing 36 has attached thereto for rotation therewith a plurality of fan blades 60.

Figure 3:
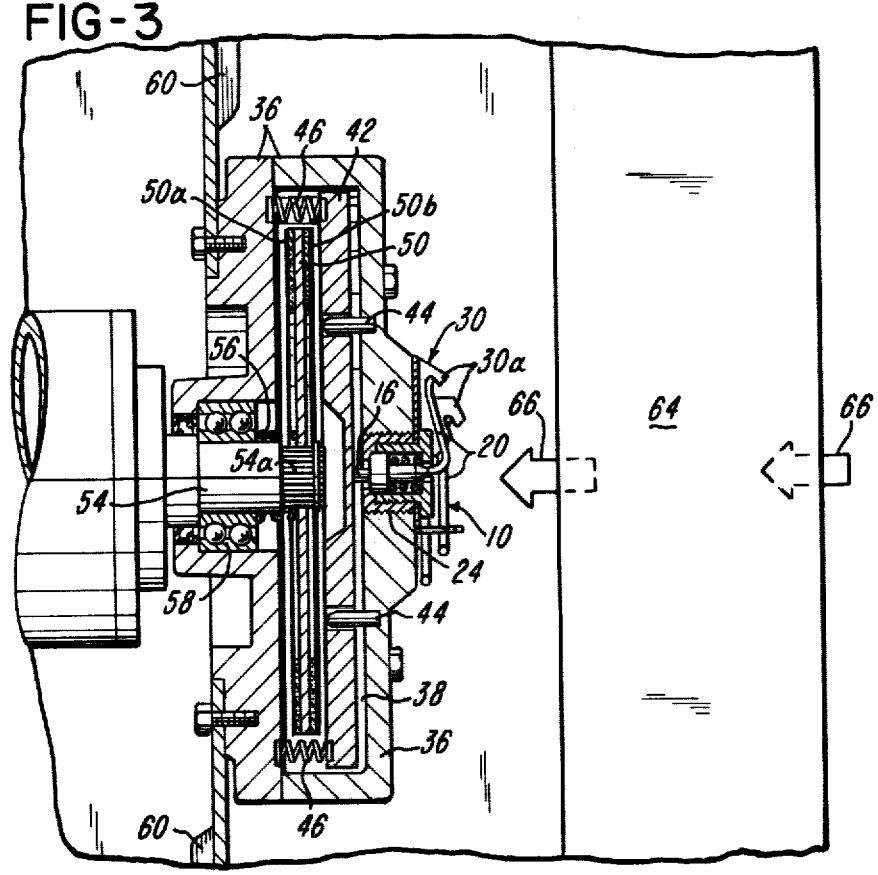
FIG. 3 is a sectional view, drawn on a slightly larger scale than FIG. 2, showing the combination of FIG. 2. This figure also illustrates a radiator or heat exchanger of the automotive apparatus with which the structure shown and disclosed is associated. This figure illustrates the clutch mechanism in a de-actuated condition.

The thermally responsive actuator device 10 of this invention is positioned adjacent a radiator or heat exchanger 64, through which air flows to cool liquid therewithin, as illustrated by arrows 66 in FIG. 3. The radiator or heat exchanger 64 is part of the cooling system of the automotive engine with which the apparatus shown and discussed herein is associated.

Figure 4:
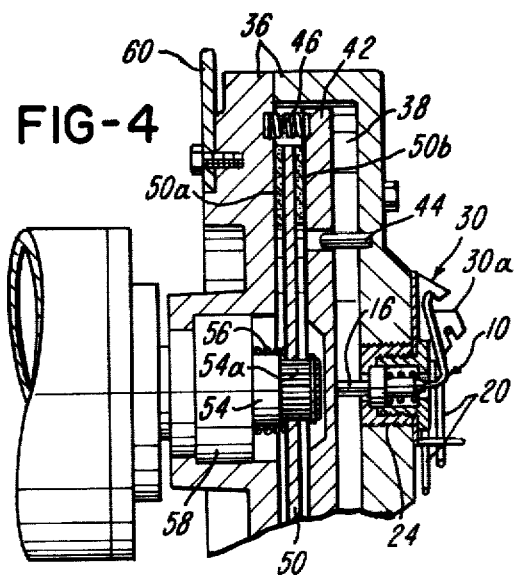
FIG. 4 is a fragmentary sectional view of the apparatus of FIG. 3, illustrating the clutch mechanism in an actuated condition.

During initial operation of an automotive engine, not shown, with which the apparatus shown and discussed herein is associated, and during "cooler" temperature conditions, the clutch mechanism is in the condition illustrated in FIG. 3. Ordinarily in clutch apparatus of the type illustrated, there is slight "clutch drag" which causes the clutch housing 36 to have slight rotation with rotation of the drive shaft 54, even when the clutch mechanism is not actuated. Thus, there is always, at least, a small volume or mass of air drawn through the radiator 64 when the drive shaft 54 is rotating. Rotation of the clutch housing 36 causes rotation of the thermally responsive actuator device 10 and the bracket 30. The wings 30a of the bracket 30 are of such a physical size and shape that the wings 30a cause movement of air adjacent the coiled tube 20 during rotation of the bracket 30. Thus, the air in contact with the coiled tube 20 is never stagnant, and the coiled tube 20 is constantly exposed to a stream of air which flows from the radiator 64. Thus the coiled tube 20 and the casing 12 and the thermally responsive material therewithin are accurately sensitive to the temperature of the air flowing from the radiator 64. Therefore, when the temperature of the air flowing from the radiator 64 rises to a predetermined magnitude, the coiled tube 20 and the casing 12 and the thermally responsive expansible-contractible material therewithin rapidly respond to the change in temperature. The thermally responsive material within the casing 12 and within the coiled tube 20 rapidly assumes a volume such that the actuator rod 16 is forced to move outwardly from the casing 12, toward the engagement plate 42 and moves the engagement plate 42 toward the clutch plate 50. The engagement plate 42 engages the clutch plate 50 and moves the clutch plate 50 into engagement with the internal surface of the clutch housing 36, as illustrated in FIG. 4. Such movement of the engagement plate 42 is against the forces of the spring members 46. When this movement of the engagement plate 42 and the clutch plate 50 occurs, the clutch housing 36 is rotated with the drive shaft 54 at the rate of rotation thereof, and the fan blades 60 are moved in an annular path with rotation of the clutch housing 36. Thus, an increased volume of air moves through the radiator 64 for cooling the coolant fluid which flows within the radiator 64.

When the temperature of air which travels through the radiator 64 and which engages the thermally responsive actuator device 10 is reduced in temperature to a predetermined magnitude, the volume of the thermally responsive material within the casing 12 and the coiled tube 20 rapidly reduces to a predetermined magnitude. Then the spring members 46 force the engagement plate 42 toward the casing 12; the clutch plate 50 moves from engagement with the clutch housing 36, and the actuator rod 16 is moved further into the casing 12, to the positions thereof illustrated in FIG. 3. The spring member 56 moves the clutch plate 50 away from the internal wall of the clutch housing 36. Thus, the clutch housing 36 is not rotated at the rate of rotation of the drive shaft 54, and the volume of air flowing through the radiator 64 is reduced.

Therefore, it is understood that a thermally responsive actuator device 10 of this invention is capable of accurately and rapidly sensing and responding to changes in ambient temperature conditions.

A thermally responsive actuator 10 of this invention may be in combination with a clutch mechanism for operation thereof as shown and described herein, or a thermally responsive actuator device 10 of this invention may be used with or in combination with any other suitable apparatus for thermally responsive actuation thereof.

Although the preferred embodiment of the thermally responsive actuator of this invention has been described, it will be understood that within the purview of this invention various changes may be made in the form, details, proportions and arrangement of parts, the combination thereof, and the mode of operation, which generally stated consist in a thermally responsive actuator within the scope of the appended claims.

The invention having thus been described, the following is claimed:

1. In combination with a rotatable fan clutch mechanism which is positioned to receive air flowing from a heat exchanger, thermally responsive actuator means for operation of the fan clutch mechanism comprising:
   a rigid container carried by the fan clutch mechanism adjacent thereto for rotation therewith and enclosing a quantity of thermally responsive expansible-contractible material, the rigid container including an elongate coiled tube having at least one convolution which is coaxial with the axis of rotation of the fan clutch mechanism and being rotatable with the fan clutch mechanism about the axis of rotation of the fan clutch mechanism, the elongate tube being positioned for engagement by air flowing from the heat exchanger,
   an actuator member having a portion within the rigid container and a portion adjacent the fan clutch mechanism, the actuator member being movable with respect to the enclosure means with expansion of the volume of the thermally responsive expansible-contractible material within the rigid container for operation of the fan clutch mechanism,
   support means carried by the rigid container and in supporting relationship to the elongate coiled tube and rotatable with rotation of the rigid container, the support means including extension wing elements which move in an annular path with rotation of the rigid container and which move air which is adjacent the support means and which is adjacent the rigid container so that air which is adjacent the rigid container including the elongate coiled tube is not permitted to be stagnant.

* * * * *